(12) United States Patent
Yin et al.

(10) Patent No.: US 10,328,583 B2
(45) Date of Patent: Jun. 25, 2019

(54) LIFTING EQUIPMENT FOR WAFFLE SLAB

(71) Applicant: RUENTEX ENGINEERING & CONSTRUCTION CO., LTD., Taipei (TW)

(72) Inventors: Samuel Yin, Taipei (TW); Tzu-Liang Wu, Taipei (TW)

(73) Assignee: RUENTEX ENGINEERING & CONSTRUCTON, CO., LTD., Taipei (TW)

( * ) Notice: Subject to any disclaimer, the term of this patent is extended or adjusted under 35 U.S.C. 154(b) by 0 days.

(21) Appl. No.: 15/807,692

(22) Filed: Nov. 9, 2017

(65) Prior Publication Data

US 2019/0061171 A1  Feb. 28, 2019

(30) Foreign Application Priority Data

Aug. 29, 2017  (TW) .............................. 106212783 U

(51) Int. Cl.
*B25J 15/00* (2006.01)
*B66C 1/44* (2006.01)

(52) U.S. Cl.
CPC ............ *B25J 15/0028* (2013.01); *B66C 1/442* (2013.01)

(58) Field of Classification Search
CPC .............................. B25J 15/0028; B66C 1/442
USPC ................................................. 294/115, 118
See application file for complete search history.

(56) References Cited

U.S. PATENT DOCUMENTS

| | | | | |
|---|---|---|---|---|
| 2,370,482 A | * | 2/1945 | Morgan | B66C 1/54 29/261 |
| 2,951,725 A | * | 9/1960 | St Jean | B66C 1/32 294/106 |
| 3,033,605 A | * | 5/1962 | Morrow, Jr. | B29D 30/0016 294/115 |
| 3,104,126 A | * | 9/1963 | Lovash | B21C 1/14 242/533.7 |
| 3,251,623 A | * | 5/1966 | Fredholm | B66C 1/54 294/93 |
| 4,460,210 A | * | 7/1984 | Miechur | B66C 1/54 294/97 |
| 6,361,094 B1 | * | 3/2002 | Pelley | A63B 47/02 294/19.2 |
| 7,207,612 B2 | * | 4/2007 | Raney | B66C 1/422 294/110.1 |

* cited by examiner

Primary Examiner — Paul T Chin
(74) Attorney, Agent, or Firm — Juan Carlos A. Marquez; Marquez IP Law Office, PLLC

(57) ABSTRACT

Lifting equipment for lifting a waffle slab used in a construction includes a main body bracket, a sliding member and a plurality of clamping mechanisms for clamping the waffle slab. The main body bracket has a through hole in a center thereof. The sliding member is slidably disposed in the through hole of the main body bracket. The sliding member includes an engagement member located at the top of the sliding member, a shaft portion connected to the bottom of the engagement member and slidably disposed in the through hole of the main body bracket, a sleeve fitted to an outer circumference of the shaft portion, and a flange fixed to the bottom of the shaft portion for preventing the sleeve from moving downward.

16 Claims, 5 Drawing Sheets

LIFTING EQUIPMENT FOR WAFFLE SLAB

BACKGROUND

Field of the Invention

The instant disclosure relates to lifting equipment, more particularly, to lifting equipment for a waffle slab used in a construction.

Description of Related Art

High-tech products, such as chips, wafers or computer components, are becoming ever more sophisticated, and requiring increasingly precise work. Therefore, clean rooms are used for keeping the production line free of contaminants that might otherwise interfere with the precision work undertaken. Waffle slabs are typically used as the floor of a clean room of a high-tech factory. A clean room is designed to maintain positive pressure such that air with contaminants is exhausted via the holes provided in the waffle slabs. The contaminated air is then filtered and returned into the clean room. Such waffle slabs made of reinforced concrete are heavy and difficult to move.

Traditionally, to lift a waffle slab, it is necessary to embed metal hooks in it before the concrete of the waffle slab becomes hardened. The metal hook is for engaging a hook of a crane so that the waffle slab can be lifted by the crane to a predetermined position. After the waffle slab is moved into position, the embedded metal hook needs to be removed as it becomes of no use and may hinder the use of the waffle slab. However, removal of the embedded metal hook damages the surface of the waffle slab, making it not as smooth. Thus, the surface of the waffle slab needs to be further processed and polished to make it flat and smooth, which prolongs the construction period.

Given the above, there is a need in the field to develop lifting equipment for lifting a waffle slab without using a metal hook embedded therein that can efficiently move the waffle slab to a predetermined position and shorten the construction period.

SUMMARY OF THE INVENTION

According to one exemplary embodiment of the instant disclosure, lifting equipment for a waffle slab used in construction comprises a main body bracket, a sliding member and a plurality of clamping mechanisms. The main body bracket has a through hole in the center thereof. The sliding member is slidably disposed in the through hole of the main body bracket and is slidable between a first position and a second position. Each of the plurality of clamping mechanisms comprises a clamping member and a connecting rod. The clamping member comprises a first end and a second end, wherein the first end is pivotally connected to an outer edge of the main body bracket, and the second end is configured to extend into a hole of the waffle slab for clamping the waffle slab. A proximate end of the connecting rod is pivotally connected to a lower end of the sliding member, and a distal end of the connecting rod is pivotally connected to the clamping member between the first end and the second end.

In order to further understand the instant disclosure, the following embodiments are provided along with illustrations to facilitate appreciation of the instant disclosure; however, the appended drawings are merely provided for reference and illustration and are not intended to be used for limiting the scope of the instant disclosure.

DETAILED DESCRIPTION OF THE PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

Figure 1:
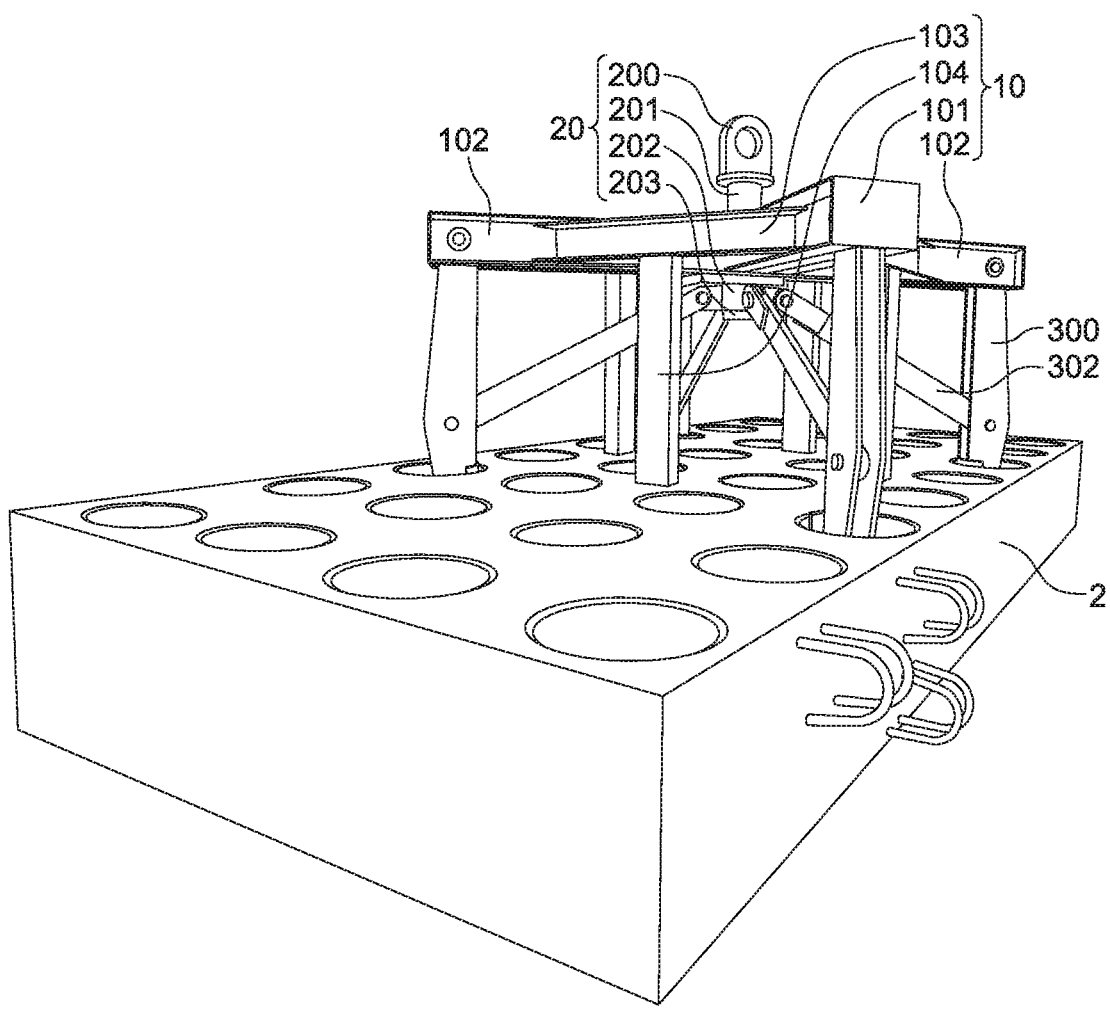
FIG. 1 is a perspective schematic view of lifting equipment used with a waffle slab in accordance with the first embodiment of the instant disclosure.
Figure 2:
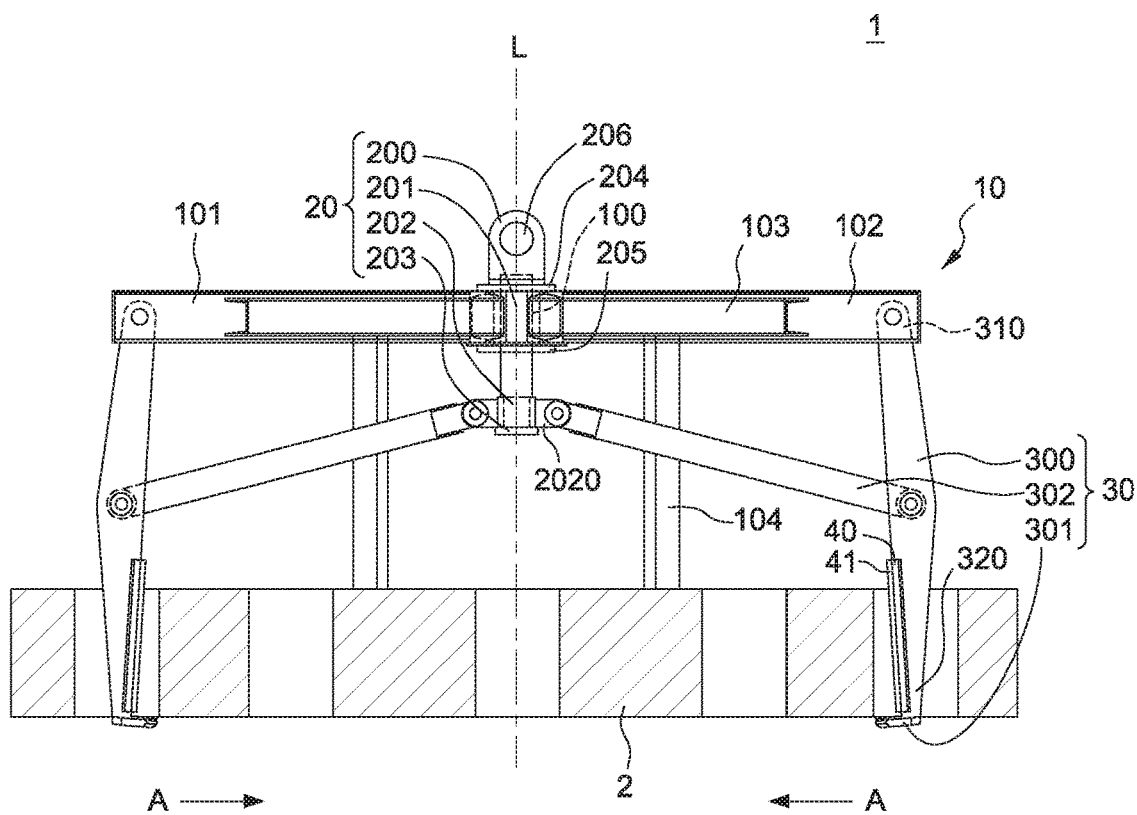
FIG. 2 is a side schematic view of the lifting equipment with the clamping mechanisms extended into the holes of the waffle slab but not clamping the waffle slab in accordance with the first embodiment of the instant disclosure.
Figure 3:
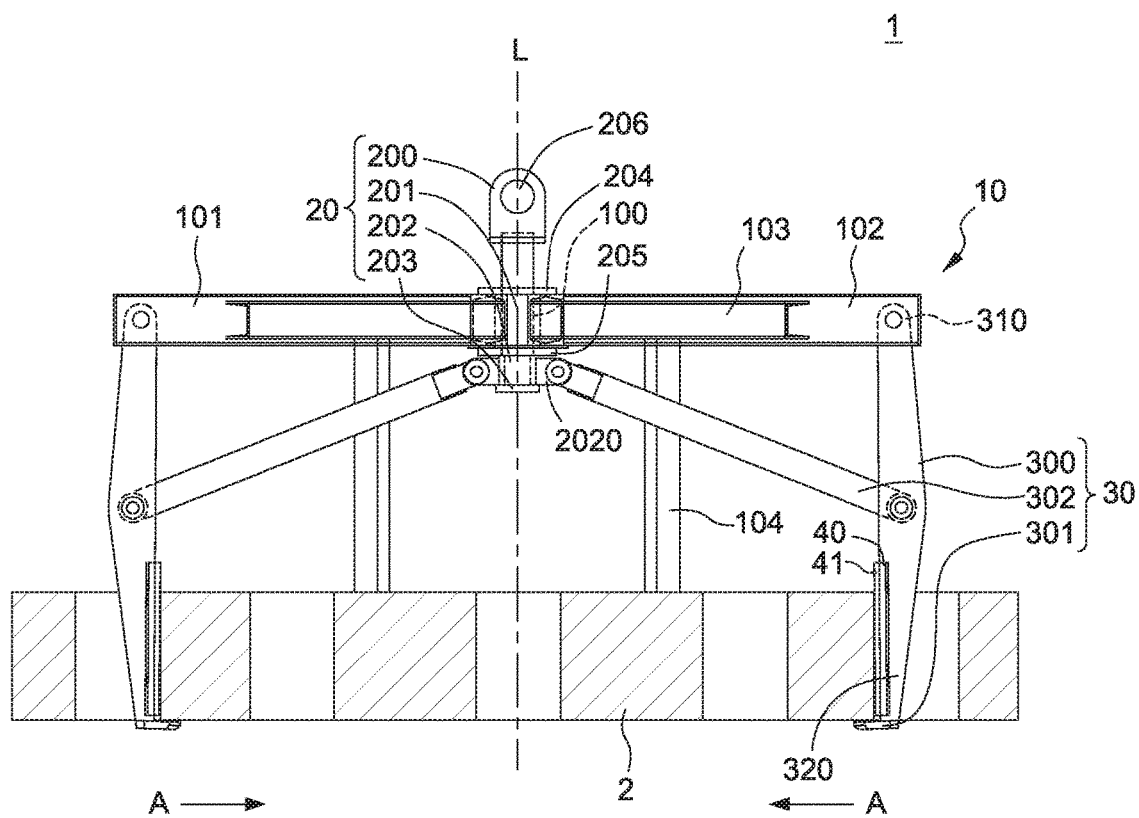
FIG. 3 is a side schematic view of the lifting equipment with the clamping mechanisms extended into the holes of the waffle slab and clamping a waffle slab in accordance with the first embodiment of the instant disclosure.

Please refer to FIGS. 1, 2 and 3. FIG. 1 is a perspective schematic view of lifting equipment used with a waffle slab in accordance with the first embodiment of the instant disclosure. FIG. 2 is a side schematic view of the lifting equipment with the clamping mechanisms extended into the holes of the waffle slab but not clamping the waffle slab in accordance with the first embodiment of the instant disclosure. FIG. 3 is side schematic view of the lifting equipment with the clamping mechanisms extended into the holes of the waffle slab and clamping the waffle slab in accordance with the first embodiment of the instant disclosure. Lifting equipment 1 comprises a main body bracket 10, a sliding member 20 and a plurality of clamping mechanisms 30. The main body bracket 10 has first beams 101, second beams 102, stiffening beams 103 and supporting posts 104. The first beams 101 and the second beams 102 extend from a center of the main body bracket 10, and the center of the main body bracket 10 has a through hole 100 therein. In an embodiment of the instant disclosure, the main body bracket 10 has two first beams 101 and two second beams 102 orthogonal to each other and are substantially X-shaped. In another embodiment of the instant disclosure, the first beams 101 and the second beams 102 are not orthogonal to each other. The shapes of the first beams 101 and the second beams 102 can be designed according to actual needs. The number of first beams 101 and of the second beams 102 are not limited to two first beams 101 and two second beams 102 as shown in the drawings.

As shown in FIGS. 1-3, two opposite ends of the stiffening beam 103 are respectively connected to a location around the middle of the first beam 101 and the second beam 102 to reinforce the stiffness of the main body bracket 10. In an embodiment of the instant disclosure, the number of stiffening beams 103 is four. The four stiffening beams 103 respectively connect the two first beams 101 and two second beams 102 as shown in the drawings. In another embodiment of the instant disclosure, the number of stiffening beams 103 is not limited to four and can be increased or decreased depending on actual needs. Each of the supporting posts 104 is substantially connected to a lower end of a middle section of the stiffening beam 103 for supporting the main body bracket 10 on an upper surface of the waffle slab 2. In an embodiment of the instant disclosure, the number of supporting posts 104 is four and they are respectively connected to the lower end of the middle section of the corresponding four stiffening beams 103. In another embodiment of the instant disclosure, the number of supporting posts 104 is not limited to four. Further, the supporting post 104 is not limited to being connected to the middle section of the stiffening beam 103, but can be adjusted based on practical needs.

The sliding member 20 comprises an engagement member 200, a shaft portion 201, a sleeve 202 and a flange 203. The engagement member 200 is located at the top of the sliding member 20 and has an opening 206 therein for engaging a hook of the crane (not shown in Figure), wherein the shape of the opening 206 can be circular, oval, egg-type or others. In an embodiment of the instant disclosure, the engagement member 200 has an circular base 209 whose diameter is larger than that of the through hole 100 of the main body bracket 10. The shaft portion 201 is connected to the bottom of the engagement member 200 and is slidably disposed in the through hole 100 of the main body bracket 10. The sleeve 202 is fitted to an outer circumference of the shaft portion 201. As shown in FIGS. 2 and 3, the sleeve 202 has a plurality of connecting portions 2020 corresponding to the number of clamping mechanisms 30. In an embodiment of the instant disclosure, the number of connecting portions 2020 is four. In another embodiment of the instant disclosure, the number of connecting portions is not four and is decided based on the number of clamping mechanisms 30. The flange 203 is fixed to the bottom of the shaft portion 201 for preventing the sleeve 202 from moving downward. The flange 203 has an internal thread corresponding to the external thread at the bottom of the shaft portion 201 such that with a proper rotation of the flange 203, it can be engaged with or separated from the shaft portion 201 and the sliding member 20 can be disassembled from the main body bracket 10 when the flange 203 is separated from the shaft portion 201. Since the shaft portion 201 is slidable within the through hole 100, at least a portion of the circular base 209 of the engagement member 200 abuts against an upper surface of the main body bracket 10 when the sliding member 20 is in the lowest position (i.e., the first position); and the top of the sleeve 202 abuts against a lower surface of the main body bracket 10 when the sliding member 20 is in the highest position (i.e., the second position). In an alternative embodiment, a first gasket 204 is disposed over the through hole 100 and on the top surface of the main body bracket 10, and a second gasket 205 is disposed beneath the through hole 100 and on the lower surface of the main body bracket 10, wherein the shaft portion 201 of the sliding member 20 penetrates the first gasket 204 and the second gasket 205 and is slidable within the through hole 100 such that the circular base 209 of the engagement member 200 abuts against the upper surface of the first gasket 204 when the sliding member 20 is in the lowest position (i.e., the first position); and the top of the sleeve 202 abuts against the lower surface of the second gasket 205 when the sliding member 20 is in the highest position (i.e., the second position).

The lifting equipment 1 has a plurality of clamping mechanisms 30. The number of clamping mechanisms 30 is the same as the number of connecting portions 2020 of the sleeve 202. The clamping mechanism 30 comprises a clamping member 300 and a connecting rod 302. The clamping member 300 has a first end 310 (i.e., the upper end) and a second end 320 (i.e., the lower end), wherein the first end 310 is pivotally connected to an outer edge of the first beam 101 or an outer edge of the second beam 102, and the second end 320 is configured to extend into a hole of the waffle slab 2 for clamping the waffle slab 2. In addition, once the clamping member 300 is activated, the clamping member 300 will move toward a central axis L of the lifting equipment 1, and thus such direction is defined as a clamping direction A in the present invention as indicated in FIGS. 2 and 3. The lower end of the clamping member 300 is provided with a holding portion 301 for clamping the bottom of the waffle slab 2, and the holding portion 301 is substantially flat. The holding portion 301 extends in the clamping direction A, and the dimension of the holding portion 301 in the clamping direction is larger than the dimension of the second end 320 of the clamping member 300 in the clamping direction A such that the holding portion 301 protrudes from the second end 320 of the clamping member 300 in the clamping direction A. The clamping surface of the clamping member 300 is provided with an elastic member 41 as a buffer when the clamping member 300 is urged against the waffle slab 2.

Figure 4:
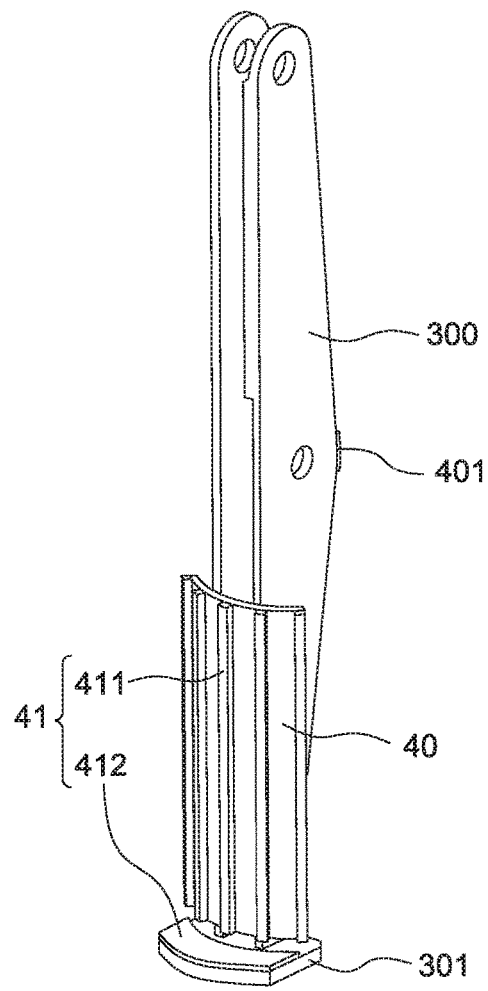
FIG. 4 is a perspective schematic view of a clamping member of a clamping mechanism.
Figure 5:
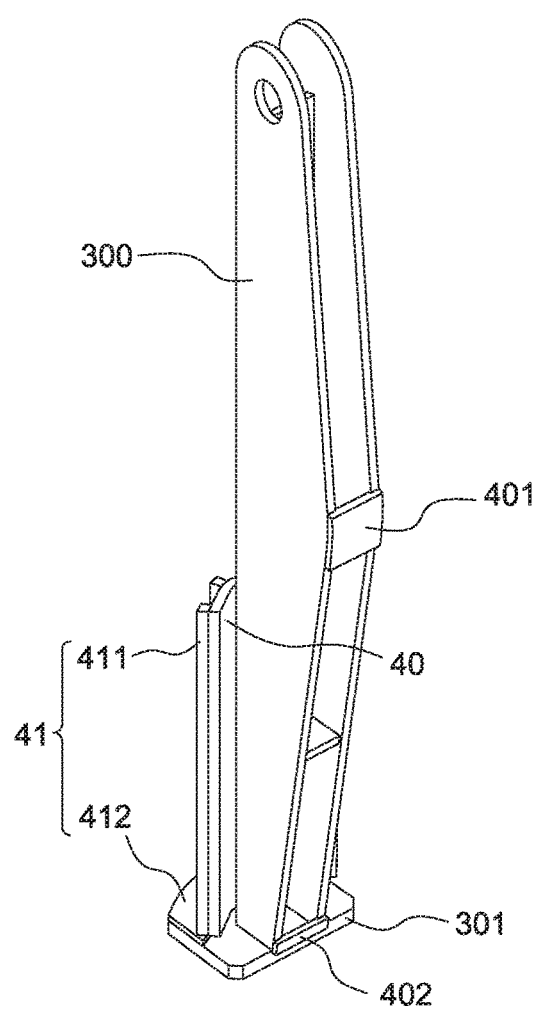
FIG. 5 is another perspective schematic view of the clamping member of the clamping mechanism.

Please refer to FIGS. 4 and 5. FIG. 4 is a perspective schematic view of a clamping member 300 of the clamping mechanism 30. FIG. 5 is another perspective schematic view of the clamping member 300 of the clamping mechanism 30. The elastic member 41 comprises a first elastic member 411 and a second elastic member 412. A plate member 40 is disposed on the clamping surface of the clamping member 300, which faces the clamping direction A. The width of the plate member 40 is greater than that of the clamping member 300 so as to increase the area of clamping surface. The clamping surface of the plate member 41 is provided with a plurality of first elastic members 411. The first elastic members 411 are substantially elongated and are disposed parallel to each other on the plate member 41. The orientation of the first elastic members is generally consistent with the lengthwise direction of the clamping member 300. In another embodiment, the orientation of the first elastic members may be transverse to the lengthwise direction of the clamping member 300. The first elastic members 411 contact with wall surface in the hole of the waffle slab 2 when the clamping member 300 clamps the waffle slab 2. The second elastic member 412 is disposed on an upper surface of the holding portion 301 to avoid damaging the bottom surface of the waffle slab 2 when the holding portion 301 contacts with the bottom of the waffle slab 2. A first plate member 401 and a second plate member 402 are disposed at positions that are relatively prominent at the outer surface of the clamping member 300, wherein the first plate member 401 is disposed at the substantially middle section of the outer surface of the clamping member 300, and the second plate member 402 is disposed at the substantially bottom of the outer surface of the clamping member 300. In addition, in a particular embodiment of the present disclosure, the outer surfaces of the first plate member 401 and the second plate member 402 are provided with elastic members to avoid damaging the wall surface in the hole of the waffle slab 2 while the clamping member 300 is inserted into the hole of the waffle slab. In an embodiment of the instant disclosure, the material of the plate member 40 is metal, and the material of the elastic member 41 is rubber. In another embodiment of the instant disclosure, the material of the plate member 40 is not metal, and can be selected from other hard materials; the material of the elastic member 41 is not limited to rubber, and can be selected from other materials with proper elasticity.

In an embodiment of the instant disclosure, the lifting equipment 1 is set to a non-clamping status before it is moved to the predetermined position where the waffle slab 2 is to be clamped and moved. That is, the sliding member 20 is in the lowest position (i.e., the first position) and a part of the shaft portion 201 is exposed below the lower surface of the main body bracket 10. A spacer (not shown) is additionally provided at the exposed shaft portion 201 between the sleeve 202 and the second gasket 205 to prevent the shaft portion 201 from moving upward such that the sliding member 20 keeps in the lowest position and the lifting equipment 1 is in the non-clamping status. In another embodiment of the instant disclosure, firstly, a rope engaged with a hook of a crane (not shown) is fastened to the main body bracket 10 rather than the engagement member 200, and then the crane lifts the lifting equipment 1 with the rope and move it to the predetermined position where the clamping members 300 are placed into the holes of the waffle slab 2. After the clamping members 300 are placed into the holes of the waffle slab 2, the hook of the crane will be disengaged from the rope and then be arranged to engage with the engagement member 200 of the sliding member 20 of the lifting equipment 1. In another embodiment of the instant disclosure, first, the connecting rod 302 is temporarily separated from the pivot portion of the connecting portion 2020 of the sleeve 202 such that the connecting rod 302 temporarily cannot be activated by the sliding member 20 until the lifting equipment 1 is moved to the predetermined position and the clamping member 300 enters into the hole of the waffle slab 2, and then the connecting rod 302 is pivotally connected to the connecting portion 2020 of the sleeve 202 again for a subsequent operation of the lifting equipment 1.

Please refer to FIG. 2, which shows the status in which the clamping mechanisms 30 of the lifting equipment 1 are not yet in contact with the waffle slab 2 where the sliding member 20 is in the lowest position (i.e., the first position). Where the engagement member 200 is not lifted up by the hook of the crane, due to the weight of the sliding member 20 itself, the sliding member 20 is in the lowest position (i.e., the first position), and at least a portion of the circular base 209 of the engagement member 200 abuts against the upper surface of the main body bracket 10 (or the upper surface of the first gasket 204 in another embodiment), and the connecting rod 302 urges the clamping member 300 outwardly (i.e., opposite to the clamping direction A), such that the clamping member 300 is not activated and does not clamp the waffle slab 2. In an embodiment of the instant disclosure, the thickness of the waffle slab 2 is about 500 mm, and the diameter of the hole of the waffle slab 2 is about 390 mm. When the clamping member 300 is not activated, the distance between the innermost end of the holding portion 301 and the wall surface of the hole of the waffle slab is about 12-18 mm, preferably about 15 mm.

Please refer to FIG. 3, which shows the status that the clamping mechanisms 30 of the lifting equipment 1 clamps the waffle slab 2; that is, the sliding member 20 is in the highest position (i.e., the second position). Where the engagement member 200 is lifted up by the hook of the crane (not shown), the top of the sleeve 202 abuts against the lower surface of the main body bracket 10 (or the lower surface of the second gasket 205 in another embodiment), and the clamping member 300 is urged inwardly (i.e., same as the clamping direction A) by the connecting rod 302, such that the clamping member 300 is activated and clamps the waffle slab 2. In an embodiment of the instant disclosure, when the sliding member 20 is in the highest position, the shaft portion 201 protrudes from the upper surface of the main body bracket 10 (or the upper surface of the first gasket 204) about 170 to 185 mm, preferably about 178 mm. The sliding member 20 of the lifting equipment 1 slides from the lowest position (i.e., the first position) to the highest position (i.e., the second position) by means of the hook of the crane such that the connecting rod 302 which is connected to the sliding member 20 activates the clamping member 300 to clamp the waffle slab 2 in the clamping direction A. In view of the above, the lifting equipment 1 of the present disclosure does not require any electronic apparatus to control the activation of the clamping member 300, thereby improving the stability and reliability of the lifting equipment 1.

Figure 6:
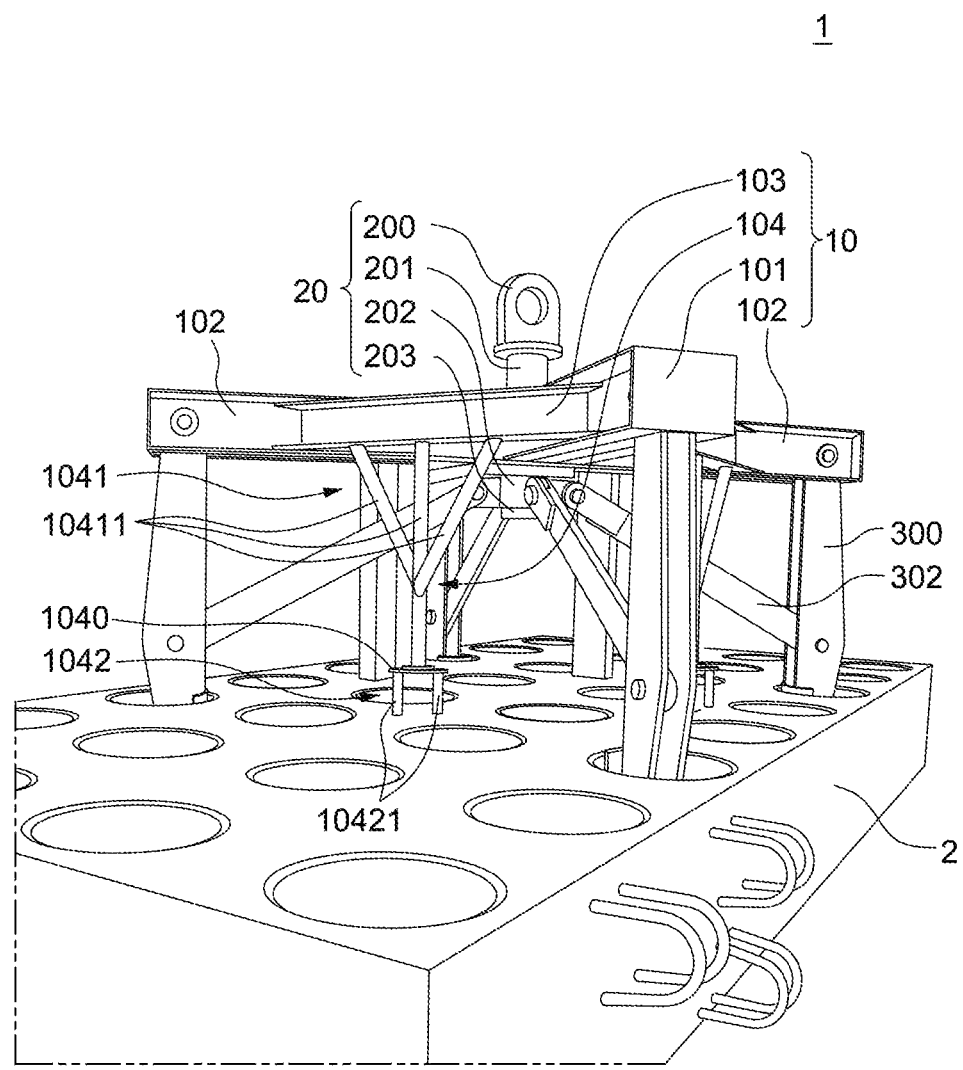
FIG. 6 is a perspective schematic view of the lifting equipment used with a waffle slab in accordance with the second embodiment of the instant disclosure.

FIG. 6 is a perspective schematic view of the lifting equipment used with a waffle slab in accordance with the second embodiment of the instant disclosure. In order to be used with waffle slabs 2 having different thicknesses, the lifting equipment 1 in accordance of the second embodiment of the present disclosure is provided with supporting posts 104 such that the height of the supporting post 104 can be adjusted when applied to the waffle slabs 2 having different thicknesses. The supporting post 104 comprises an adjuster 1040, an upper portion 1041 and a lower portion 1042. The upper end of the upper portion 1041 is connected to the lower end of the middle section of the stiffening beam 103. The lower end of the upper portion 1041 is connected to the adjuster 1040, wherein the lower end of the upper portion 1041 has threads such that the adjuster 1040 can be rotated upwardly or downwardly to adjust the height of the supporting post 104. In an embodiment of the instant disclosure, a substantially middle section of the upper portion 1041 is provided with three branches 10411 to respectively support the lower end of the stiffening beam 103. This configuration can distribute the stress of the stiffening beam 103. In another embodiment of the instant disclosure, the number of branches of the upper portion 1041 is not limited to three, but can be adjusted based on the needs of the design. The upper end of the lower portion 1042 is connected to the adjuster 1040, and the lower end of the lower portion 1042 is used for contacting the upper surface of the waffle slab 2. In an embodiment of the instant disclosure, the lower portion 1042 is provided with a plurality of legs 10421, such as two legs 10421. In an embodiment of the instant disclosure, the length of the supporting post 104 is about 1000 to 1050 mm, preferably about 1015 mm.

The above embodiments merely describe the principle and effects of the present disclosure, instead of limiting the scope of the present disclosure. Therefore, persons skilled in the art can make modifications to and variations of the above embodiments without departing from the spirit of the present disclosure. The scope of the present disclosure should be defined by the appended claims.

What is claimed is:
1. Lifting equipment for a waffle slab used in a construction, comprising:
 a main body bracket having a through hole in the center thereof;
 a sliding member slidably disposed in the through hole of the main body bracket and slidable between a first position and a second position;

a plurality of clamping mechanisms, wherein each of the plurality of clamping mechanisms comprises:
a clamping member comprising a first end which is pivotally connected to an outer edge of the main body bracket, and a second end which is configured to extend into a hole of the waffle slab for clamping the waffle slab and is connected to a holding portion; and
a connecting rod, wherein a proximate end of the connecting rod is pivotally connected to a lower end of the sliding member and a distal end of the connecting rod is pivotally connected to the clamping member between the first end and the second end;
wherein the sliding member comprises:
an engagement member located at the top of the sliding member;
a shaft portion connected to the bottom of the engagement member and slidably disposed in the through hole of the main body bracket;
a sleeve fitted to an outer circumference of the shaft portion; and
a flange fixed to the bottom of the shaft portion for preventing the sleeve from moving downward.

2. The lifting equipment according to claim 1, wherein at least one portion of the bottom of the engagement member abuts against an upper surface of the main body bracket and the clamping member is not activated when the sliding member is in the first position; the top of the sleeve abuts against a lower surface of the main body bracket and the clamping member is activated to move toward a central axis of the lifting equipment and defines a clamping direction when the sliding member is in the second position.

3. The lifting equipment according to claim 2, wherein the holding portion protrudes from the second end of the clamping member in the clamping direction for clamping the bottom of the waffle slab.

4. The lifting equipment according to claim 3, wherein the holding portion is substantially flat.

5. The lifting equipment according to claim 1 wherein the engagement member has an opening for engaging a hook.

6. The lifting equipment according to claim 5, wherein the engagement member has a circular base whose diameter is larger than that of the through hole.

7. The lifting equipment according to claim 1 wherein the sleeve has a plurality of connecting portions corresponding to the number of clamping mechanisms, and the proximate end of the connecting rod is pivotally connected to a corresponding connecting portion of the plurality of connecting portions.

8. The lifting equipment according to claim 1, further comprising a first gasket and a second gasket respectively disposed on a top surface and a lower surface of the main body bracket, and the shaft portion of the sliding member penetrates the first gasket and the second gasket, respectively.

9. The lifting equipment according to claim 1, wherein the main body bracket has a plurality of first beams and a plurality of second beams, and the plurality of first beams and the plurality of second beams extend outwardly from the center of the main body bracket and are substantially perpendicular to each other.

10. The lifting equipment according to claim 9, wherein the main body bracket further comprises at least one stiffening beam which is connected to one of the plurality of first beams and one of the plurality of second beams, respectively, to reinforce the stiffness of the main body bracket.

11. The lifting equipment according to claim 10, wherein the main body bracket further comprises at least one supporting post which is substantially connected to a lower end of a middle section of the at least one stiffening beam for supporting the main body bracket on an upper surface of the waffle slab.

12. The lifting equipment according to claim 11, wherein the at least one supporting post comprises:
an adjuster for adjusting the height of the at least one supporting post:
an upper portion, wherein one end of the upper portion is connected to the lower end of the middle section of the at least one stiffening beam, and the other end of the upper portion is connected to the adjuster; and
a lower portion, wherein one end of the lower portion is connected to the adjuster and the other end of the lower portion is for contacting the upper surface of the waffle slab.

13. The lifting equipment according to any one of claims 3 to 12, further comprising:
a plate member disposed on a clamping surface of the clamping member near the second end; and
an elastic member disposed on at least one of the plate member, an outer surface of the clamping member opposite to the clamping surface and the holding portion of the clamping member.

14. The lifting equipment according to claim 13, wherein the elastic member comprises:
a first elastic member which is substantially elongated and is disposed parallel to another first elastic member on the plate member, the first elastic member being for contacting the waffle slab when the clamping member clamps the waffle slab; and
a second elastic member disposed on an upper surface of the holding portion.

15. The lifting equipment according to claim 14, wherein the material of the plate member is metal, and the material of the elastic member is rubber.

16. The lifting equipment according to claim 8, wherein at least a portion of a circular base of the engagement member abuts against an upper surface of the first gasket when the sliding member is in the first position, and wherein the top of the sleeve abuts against a lower surface of the second gasket when the sliding member is in the second position.

* * * * *